UNITED STATES PATENT OFFICE.

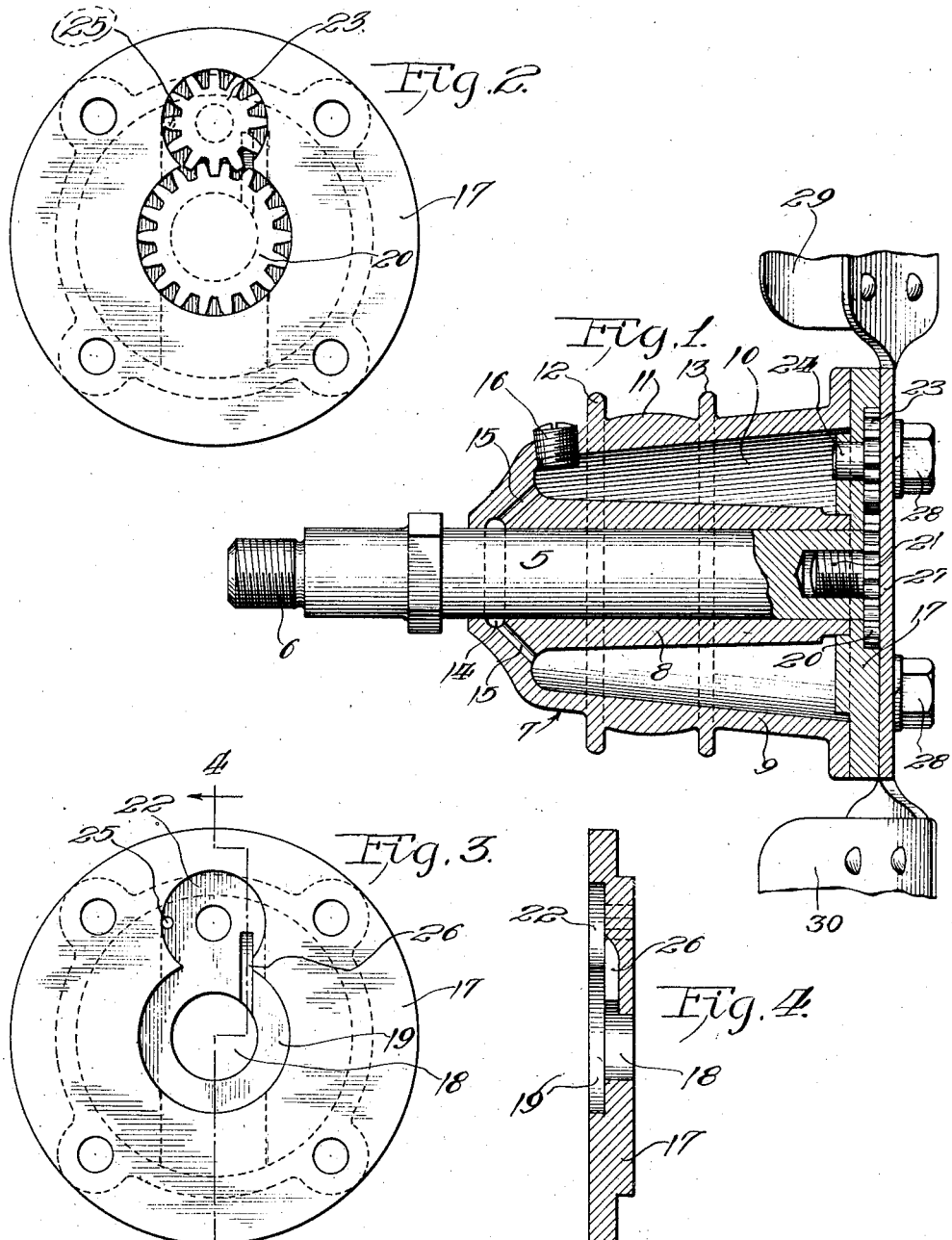

TRUMAN B. FUNK, OF MOLINE, ILLINOIS.

HUB-BEARING.

1,378,587.  Specification of Letters Patent.  Patented May 17, 1921.

Application filed May 3, 1920. Serial No. 378,461.

*To all whom it may concern:*

Be it known that I, TRUMAN B. FUNK, a citizen of the United States, residing at Moline, in the county of Rock Island and State of Illinois, have invented certain new and useful Improvements in Hub-Bearings, of which the following is a specification.

The present invention has to do with improvements in bearings. The invention has reference particularly to the construction and arrangement of bearings which are lubricated by means of oil or lubricant circulated under pressure. The features of the invention are very well adapted for use in bearings for automobile fans and the like, although it will presently appear that the features of the invention may also be used in other locations and for lubrication of other bearings. Nevertheless, inasmuch as the features of the invention are especially well adapted for the lubrication of automobile fan bearings, I have illustrated the invention and will describe the same as being applied to this particular type of bearing.

One of the objects of the present invention is to provide a bearing of very simple construction, and one which can be made cheaply and from a minimum number of parts. Another object of the invention is to provide a bearing for fans and the like which will be self-contained, and of which the parts are so formed that they can be very easily cast and put through the various manufacturing operations.

Other objects and uses of the invention will appear from a detailed description of the same which consists in the features of construction and combinations of parts hereinafter described and claimed.

In the drawing:

Figure 1 shows a longitudinal cross section through a bearing embodying the features of the present invention, and as the same may be used for an automobile fan or the like;

Fig. 2 shows an end face view of the bearing of Fig. 1, with the fan plate removed, the gear and pinion being in position;

Fig. 3 shows a view corresponding to Fig. 2, with the exception that the gear and pinion has been removed; and Fig. 4 shows a section taken on the line 4—4 of Fig. 3, looking in the direction of the arrows.

The bearing of the present invention is shown as mounted upon a stud or pin 5, the end 6 of which may be secured to the engine cylinder block or any other suitable stationary part. The outer portion of this stud or pin 5 constitutes a bearing member upon which the main or body portion 7 rotates. This body portion is shown as being in the form of a casting having a central sleeve or neck 8 which rotates upon the stud or pin; and an outer encircling or cylindrical portion 9. These portions 8 and 9 provide an oil or lubricant space 10 between them. If desired, a belt surface 11 may be provided, generally crowned, and this may be embraced between the ribs 12 and 13.

At its inner end the body member 7 is also provided with an inner groove or encircling recess 14 which communicates with the oil space 10 by means of one or more passages 15. An opening may be provided for filling the oil space 10, said opening being normally closed by means of a plug or the like 16.

It is to be observed that the outer ends of the sleeve or collar 8 and of the surrounding flanges 9 are separated from each other, so that the entire element 7 may be readily cast with the use of a very simple form of mold. A circular cap plate 17 is provided for covering over the outer end of the oil space 10. This cap plate is provided with a central perforation 18 which receives the end of the stud or pin 5; and when the cap plate 17 is set into position, it effectually closes the oil space 10. It is provided with a central circular depression 19 into which seats a gear 20. This gear is provided with a stud or projection 21 which threads onto the end of the stud or pin 5 and thus serves not only to hold the gear itself stationary, but also serves to retain the plate 17, and, therefore, the body member 7 in position on the pin 5 without binding.

The plate 17 is also provided with another circular recess 22 which segmentally communicates with the recess 19, and a pinion 23 is seated into the recess 22. This pinion is mounted on the stud 24 in the plate 17.

A perforation 25 passes through the plate 17 to the oil space 10, and allows the oil to reach the spaces between the teeth of the pinion. A groove or depression 26 is provided in the face of the depressions 19 and 22 and is located at the point where the teeth of the pinion and gear come together, and this groove 26 communicates with the end portion of the stud or pin 5. Oil is thus forced through the groove or depression 26 down against the end of the stud or pin 5 whence it travels along the same, thus lubricating the bearing. The oil so delivered ultimately finds its way into the groove 14, and thence back through the perforations 15 to the oil space.

A plate 27 is secured to the outer face of the plate 17 by means of a series of tap screws 28, and the fan plates 29 and 30 are secured to and carried by the plate 27. This plate 27 covers over the gear and pinion and closes the oil spaces between their teeth, so that the oil is compelled to travel in the manner above explained.

While I have herein shown and described only a single embodiment of the features of my present invention, still I do not limit myself to the same, except as I may do so in the claims.

I claim:

1. A pressure lubricated bearing or the like comprising, in combination, a stationary stud, a circular body member rotatably mounted on said stud and comprising an integral element having a circular sleeve journaled on the stud and also having an integral shell integral at its inner end with said sleeve and spaced away from the sleeve in its central and outer end portions to provide with the sleeve an annular oil space, there being an inwardly facing groove on said body member at its inner end and in direct communication with the stud, an oil passage connecting said groove with said annular oil space, a flange plate in conjunction with the outer ends of the sleeve and shell aforesaid and serving to inclose said oil space, there being a circular recess in the outer face of said plate concentric with the stud, and there being another circular recess in the outer face of the plate in peripheral communication with the first mentioned recess, a gear in the first mentioned recess and rigid with respect to the end of the stud and also serving to retain the plate in position with respect to the stud, a pinion in the second mentioned recess meshing with the gear, there being an oil passage extending through the plate and in communication with the line of travel of the pinion teeth, and there being an oil discharge recess in the front face of the plate establishing communication of the point of enmeshment of the pinion and gear teeth with the end of the stud, and a cover plate secured to the outer end of the flange plate and closely engaging the gear and pinion, substantially as described.

2. A pressure lubricated bearing comprising, in combination, a stationary stud, a circular body member rotatably mounted on said stud and comprising an integral element having a circular sleeve journaled on the stud and also having an integral shell integral at its inner end with said sleeve and spaced away from the sleeve in its central and outer end portions to provide with the sleeve an annular oil space, an oil passage at the inner end of the member connecting said annular oil space with the sleeve, a flange plate in conjunction with the outer ends of the sleeve and shell aforesaid and serving to inclose said oil space, there being in the outer face of said plate a pair of circular recesses in peripheral communication with each other, one of which recesses is concentric with respect to the stud, a gear in said recess and stationary with respect to the stud, a pinion in the other recess meshing with the gear, there being an oil passage extending through the plate and in communication with the line of travel of the pinion teeth, and there being an oil discharge recess in the front face of the plate establishing communication of the point of enmeshment of the pinion and gear teeth with the end of the stud, and a cover plate secured to the outer end of the flange plate and closely engaging the gear and pinion, substantially as described.

3. A pressure lubricated bearing comprising, in combination, a stationary stud, a circular body member rotatably mounted on said stud and comprising an integral element having a circular sleeve journaled on the stud and also having an integral shell integral at its inner end with said sleeve and spaced away from the sleeve in its central and outer end portions to provide with the sleeve an annular oil space, an oil passage at the inner end of the member connecting said annular oil space with the stud, a flange plate in conjunction with the outer ends of the sleeve and shell aforesaid and serving to inclose said oil space, a cover plate in conjunction with the flange plate, a pair of circular recesses inclosed between the flange plate and cover plate and in peripheral communication with each other, one of said recesses being concentric with the stud, a gear in said concentric recesses in fixed conjunction with the stud, a pinion in the other recess meshing with the gear, there being a passage extending through the flange plate and establishing communication between the oil space and the path of travel of the pinion teeth, and there being a recess in the flange plate establishing communication between the point of enmeshment of the pinion and gear teeth and the end of the stud, substantially as described.

TRUMAN B. FUNK.